(No Model.)
S. PRATT.
PROCESS OF MAKING STARCH CONTAINING SOLUTIONS FOR USE IN BREWING, DISTILLING, &c.
No. 524,651. Patented Aug. 14, 1894.
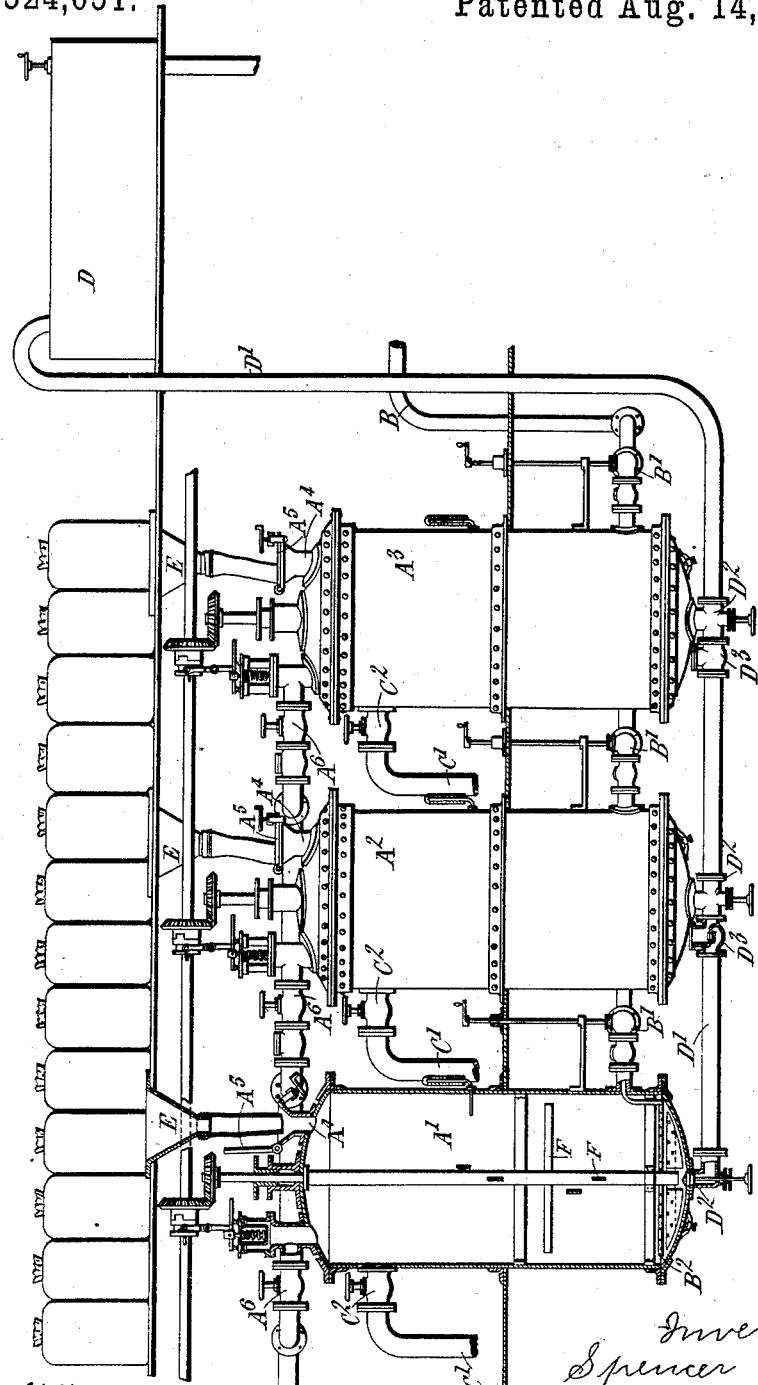
Witnesses;
G. W. Rea,
J. H. Daly.
Inventor;
Spencer Pratt,
By James L. Norris
atty.

UNITED STATES PATENT OFFICE.

SPENCER PRATT, OF LONDON, ASSIGNOR OF ONE-FOURTH TO REGINALD WATNEY, OF BRIGHTON, ENGLAND.

PROCESS OF MAKING STARCH-CONTAINING SOLUTIONS FOR USE IN BREWING, DISTILLING, &c.

SPECIFICATION forming part of Letters Patent No. 524,651, dated August 14, 1894.

Application filed May 12, 1893. Serial No. 473,999. (No specimens.) Patented in England February 14, 1893, No. 3,302; in France May 5, 1893, No. 229,878; in Belgium May 6, 1893, No. 104,547; in Germany May 15, 1893, No. 75,478, and in Austria-Hungary September 5, 1893, No. 43 and No. 3,609.

*To all whom it may concern:*

Be it known that I, SPENCER PRATT, analytical chemist, a subject of the Queen of Great Britain, and a resident of Lower Tooting, London, Surrey, England, have invented certain new and useful Improvements in Processes of Making Starch-Containing Solutions for Use in Brewing, Distilling, the Manufacture of Glucose, and in Similar Operations, (for which I have obtained patents in Great Britain, No. 3,302, dated February 14, 1893; in France, No. 229,878, dated May 5, 1893; in Belgium, No. 104,547, dated May 6, 1893; in Germany, No. 75,478, dated May 15, 1893, and in Austria-Hungary, No. 43 and No. 3,609, dated September 5, 1893;) and I do hereby declare that the following is a full, clear, and exact description of the invention, which will enable others skilled in the art to which it appertains to make and use the same.

My invention relates to improvements in the production of a starch-containing solution for use in brewing, distilling, the manufacture of glucose, vinegar-making, and other processes or manufactures in which starch is required in a highly liquid form. Starch in this form is particularly useful in brewing, distilling, vinegar-making and analogous operations, inasmuch as diastase is able to act readily thereon.

Heretofore, many attempts have been made to obtain starch, in a condition in which diastase will readily act thereon, from rice, maize, sago-flour and other starch-containing substances (hereinafter referred to, for the sake of convenience, by the term "raw grain") by processes in which the starch of the raw grain has been gelatinized by the action of steam, and so-called "flaked malts" and similar articles have been thus produced, but in all these products, the oils, albumenoids, and impurities originally contained in the raw grain have not been separated, or have been only partially separated, and have been the cause of considerable difficulty in the mash tun by reason of their preventing thorough and proper drainage, and also by reason of their imparting objectionable flavors to the beers produced with their aid. In the said processes the raw grain is treated for periods varying from about two to thirty-six hours in the presence of steam at temperatures not exceeding 310° Fahrenheit and at corresponding pressures. It is a fundamental defect of the said processes that the products thereof are not in the condition best suited to enable diastase to act readily thereon. The said processes possess further defects, inasmuch as if they are practiced on a scale of a magnitude sufficient to render them of service, commercially, it is necessary that large quantities of raw grain should be operated upon at a time, and necessary, therefore, that large receivers for the said large quantities should be provided. The provision of the said receivers necessitates a considerable initial outlay, for they must not only be large, but must in addition be of sufficient strength to withstand the internal pressure to which they are subjected by the steam employed in the said processes. Moreover the duration of the processes, even in cases in which it does not exceed the minimum of two hours hereinbefore stated, increases the necessity for the treatment, in the said processes, of a greater quantity of material at a time, than need be dealt with if the duration of the treatment be shortened. The cost and the difficulty of handling the raw grain in processes in which a considerable bulk and weight of material is treated in one operation, are further disadvantageous features of the said processes.

The principal object of my invention is to enable the whole of the starch contained in raw grain to be obtained therefrom in a highly liquid condition, free from oils, albumenoids, and impurities, and in the state best suited either to permit the diastase of the malt to act thereon immediately, or to permit the said starch to be advantageously employed in the manufacture of glucose, for instance; it is an important feature of my invention that the said oils and albumenoids are set free in such a condition that their utilization as valuable by-products is facilitated. This object I effect by a process which is hereinafter fully set forth and which involves the treatment of raw grain or raw grain and malt, in water with steam. The said process can be effected with but small expense for the installation of plant and the subsequent working, and can be properly carried out with great rapidity, being of brief duration; it is economical with regard to the steam used, and can be repeated at very frequent intervals, so that the production of the liquid starch is made almost continuous by the treatment of small quantities of raw grain in vessels of small size, easily constructed to withstand any desired internal pressure. Further, I improve the drainage in the mash tun by the production, in the manner hereinafter set forth, of a solution of starch from which the insoluble constituents of the raw grain are separable with great facility.

According to one method of carrying my said invention into practice, I mix raw grain with water in the manner and proportions hereinafter specified, and I subject the mixture to steam as hereinafter set forth at temperatures of at least 350° Fahrenheit, but preferably 370° Fahrenheit, and at absolute pressure of one hundred and thirty-five pounds to one hundred and seventy-five pounds per square inch in a suitable vessel. Immediately a pressure and temperature within the said limits or thereabout are reached, the whole of the starch is dissolved in the water and brought into a condition to be readily acted upon by the diastase of the malt, and the solution can be at once filtered with ease and rapidity, as it is remarkably fluid, and, when cooled to the required mashing temperature may be used instead of water for mashing with malt in the usual way. In certain cases I find it advantageous to mix from five to twenty per cent. by weight of ground malt with the raw grain, as hereinafter set forth, in order to facilitate filtration.

When ground malt is used the minimum limit of temperature and pressure may safely be, respectively, 328° and one hundred pounds absolute, instead of 350° and one hundred and thirty-five pounds aforesaid. But it is preferable, even when malt is used, that the temperatures and pressures should be kept within their respective limits of 350° and 370° and one hundred and thirty-five pounds and one hundred and seventy-five pounds, as aforesaid.

In order that my said invention may be clearly understood I will now proceed to describe, by way of example and with reference to the accompanying diagram, a method of carrying it into practice.

The said diagram indicates the general arrangement of apparatus for the treatment hereinafter specified.

$A'$ $A^2$ $A^3$ are vessels hereinafter referred to as dissolvers. They are fitted with suitable thermometers, pressure gages, and safety valves.

B is a pipe fitted with suitable valves $B'$ by which steam is introduced to perforated pipes $B^2$ in the dissolvers; from the said perforated pipes it issues into the material placed in the said dissolvers. Water is supplied to the interior of the dissolvers by pipes $C'$ fitted with valves $C^2$.

D is a settling back connected by the pipe $D'$ with each dissolver. Suitable valves $D^2$ and non-return valves $D^3$ are placed in the said pipe $D'$ to control the passage of fluid therethrough.

E E are hoppers from which the raw grain is delivered to the dissolvers through the openings $A^4$ which are provided with removable covers $A^5$.

$A^6$ is a blow-off cock on each dissolver.

F is a stirrer rotatable in each dissolver and driven by any suitable means so that the contents of the said dissolver may be stirred and brought into intimate contact with the steam which is supplied thereto.

The several dissolvers are worked successively so that the process hereinafter set forth is very nearly a continuous one.

I will now describe the process as carried out in the dissolver $A'$, by way of example, as the process is carried out in exactly the same manner in the other dissolvers. I introduce raw grain to the dissolver $A'$ through the opening $A^4$ and also water through the pipe $C'$, to form the aforesaid mixture of raw grain and water which consists, for instance, of one quarter (three hundred and thirty-six pounds) of raw grain to about three hundred and thirty gallons of water. The water is first placed in the dissolver; into it I introduce steam from a boiler or other suitable source, by way of the pipes B $B^2$ so as to raise it to a temperature of 140° Fahrenheit. I then shut off the steam and introduce by way of the opening $A^4$ the raw grain, either with or without the addition of ground malt (the said malt being in the proportion of five to twenty per cent. by weight of the raw grain) into the said heated water from the hopper E and when it has thus been introduced the cover $A^5$ is securely fastened down and all valves on the dissolver are closed. Steam is then introduced again into the dissolver so as to gradually raise the temperature of its contents to 180° Fahrenheit. The steam inlet valve $B'$ is then turned full on until the whole of the contents of the said dissolver have been raised to the necessary temperature of from 350° Fahrenheit to 370° Fahrenheit and an absolute pressure of one hundred and thirty-five pounds to one hundred and seventy-five pounds to the square inch. The blow off cock $A^6$ is then opened and the steam and the whole of the volatile oils which are contained therein are blown off, the said steam being thereafter condensed or otherwise suitably treated for the extraction of the said oils, which, as aforesaid, are valuable by-products.

The raising of the temperature and pressure as aforesaid is effected in a very short period, and as soon as the temperature within the said limit of 350° Fahrenheit to 370° Fahrenheit or thereabout is obtained and the oils volatilized the whole of the starch will have been rendered liquid, and the solution containing the liquid starch can be immediately blown out of the dissolver into the settling back D through the pipe D' by the pressure of the steam in the said dissolver; or it may be transferred in any other suitable manner to the settling back; or the said solution can be filtered. Owing to the high fluidity of the solution the operation of settling and filtration is very easily and rapidly accomplished and during the said operation the albumenoids are deposited or extracted; they may be afterward pressed into cakes, as they constitute a valuable feeding material. When cooled to the required mashing temperature the resulting bright solution may be used instead of water alone, for mashing with malt in the usual way but with a far more satisfactory result; or it may be employed in the manufacture of glucose or for other purposes.

By the production of a highly liquid solution of starch as hereinbefore set forth, I am able to use in a mixture of malt and raw grain fifty per cent. of raw grain, and as the starch is entirely freed from the volatile oils and the albumenoids and impurities in the manner hereinbefore described, the whole of the said starch is utilized and I am able to obtain a far more satisfactory result than hitherto, inasmuch as an increase of fully twenty per cent. of extract may be obtained by the use of starch prepared according to my invention as aforesaid. In addition there can be no defective drainage as the starch is converted into maltose and dextrose in the mash tun, and the albumenoids and other impurities contained in the raw grain will have been completely coagulated owing to the high temperature employed in the dissolver and will have been removed, by the settling or filtration as aforesaid.

By the term "highly-liquid starch-containing solution" I do not desire to convey the idea that the said solution contains starch alone and unaltered, for such is not the case, inasmuch as the starch undergoes a marked change, and the said solution, upon the completion of my process is found to contain, approximately, thirty per cent. of soluble starch, and seventy per cent. of bodies similar in composition to dextrine, dextrose, maltose, and such carbo-hydrates. It is only by the employment of the high temperatures and pressures aforesaid that the starch can thus be split up and brought into the condition required for obtaining a clear solution.

I wish it to be clearly understood that the employment in the dissolver of a high temperature, of at least 350° Fahrenheit, but preferably 370° Fahrenheit, and corresponding absolute pressure of one hundred and thirty-five pounds to one hundred and seventy-five pounds per square inch is an essential feature of my invention but I do not limit my said invention to the particular methods, apparatus and proportions of materials hereinbefore set forth by way of example, for it is obvious that these may be varied without departing from the nature of my invention.

The addition of the malt to raw grain and water and treating the mixture as herein described has a remarkable liquefying action on the starch at high temperatures and pressures. It makes the process more complete and also very materially shortens the time required for carrying out the process, and moreover it has the effect of greatly facilitating filtration.

It is found that lower values of pressures and temperatures as aforesaid can be used when malt is employed than when it does not form part of the mixture.

What I claim is—

1. The process herein described of producing a highly-liquid starch-containing solution, which consists in admixing raw grain and water in, approximately, such relative proportions and under such conditions as are herein set forth, that is to say, the addition of three hundred and thirty-six pounds of raw grain to about three hundred and thirty gallons of water at a temperature of 140° Fahrenheit, raising the temperature of the whole to at least 350° Fahrenheit, under an absolute pressure of at least one hundred and thirty-five pounds per square inch, but preferably 370° Fahrenheit and one hundred and seventy-five pounds per square inch, substantially as described.

2. For the production of a highly-liquid starch-containing solution, the process constituted by the admixture of raw grain, malt, and water in, approximately, such relative proportions and under such conditions as are herein set forth, that is to say:—the addition of three hundred and thirty-six pounds of raw grain and seventeen to sixty-eight pounds of ground malt to about three hundred and thirty gallons of water at a temperature of 140° Fahrenheit, then raising the temperature of the whole to at least 350° Fahrenheit, under an absolute pressure of at least one hundred and thirty-five pounds per square inch, substantially as set forth.

3. For the production of a highly-liquid starch-containing solution, the process constituted by the admixture of raw grain, malt, and water in, approximately, such relative proportions and under such conditions as are herein set forth, that is to say:—the addition of three hundred and thirty-six pounds of raw grain and seventeen to sixty-eight pounds of ground malt to about three hundred and thirty gallons of water at a temperature of 140° Fahrenheit gradually raising the mixture of raw grain, malt, and water to a temperature of 180° Fahrenheit, then raising the temperature of the whole, rapidly, to at least 350° Fahrenheit but preferably 370° Fahrenheit under absolute pressures of one hundred and thirty-five to one hundred and seventy-five pounds per square inch substantially as set forth.

In witness whereof I have hereunto set my hand this 18th day of April, 1893.

SPENCER PRATT.

Witnesses:
 WM. JNO. TENNANT,
 THOMAS LAKE.